United States Patent
Gorgei et al.

[15] 3,656,607
[45] Apr. 18, 1972

[54] CONVEYOR SYSTEM FOR VISCOUS OR CEMENTITIOUS MATERIAL

[72] Inventors: Donald J. Gorgei, Boardman, Ohio; Daniel I. Weisz, Ellwood City; Russell B. Cooper, New Castle, both of Pa.

[73] Assignee: Beaver-Advance Corporation, Ellwood City, Pa.

[22] Filed: Sept. 16, 1969

[21] Appl. No.: 858,384

[52] U.S. Cl.....................198/118, 198/89, 104/135, 238/175, 104/95
[51] Int. Cl.......................................................B65g 21/00
[58] Field of Search................198/89, 92, 118, 126; 104/95, 104/131, 126; 238/10, 172, 174, 175, 177, 184, 181, 259, 263

[56] References Cited

UNITED STATES PATENTS

| | | | |
|---|---|---|---|
| 2,759,430 | 8/1956 | Kelsey | 104/131 |
| 3,446,158 | 5/1969 | Pettit | 104/95 |
| 2,018,360 | 10/1935 | Heintges | 198/1 |
| 1,278,796 | 9/1918 | Veinot | 198/121 X |
| 1,073,376 | 9/1913 | Vivian | 198/118 |
| 2,309,715 | 2/1943 | Rudow | 198/98 |
| 3,343,651 | 9/1967 | Oury et al. | 198/92 |

Primary Examiner—Gerald M. Forlenza
Assistant Examiner—Jerold M. Forsberg
Attorney—Green, McCallister & Miller

[57] ABSTRACT

An adaptable, flexible conveyor system is provided which employs material carrying continuous belt pick-up, conveyor-transfer and turret sections. The conveyor sections are at their adjacent ends positioned in a forwardly and backwardly movably supported and horizontally-pivoted relation with respect to each other and with respect to a pick-up and to a turret section from whose continuous conveyor, cementitious, grout or somewhat viscous material is delivered to a work area. The turret section and the head end of a transfer section with which it cooperates to receive material therefrom are both mounted for forward and backward movement on a longitudinally-extending elevated track. A transfer assembly is pivotally-carried between the forward end of one conveyor section and the tail end of a cooperating conveyor section to which the material is to be delivered, and a scraper assembly is carried by the forward end of the one conveyor section within the transfer assembly for removing adhering material from the belt adjacent a head pulley. A combination scraper means is provided for cleaning an underside of a belt and the exposed side of a drive pulley at the tail end of each conveyor section which has its own individual drive unit that is mounted to facilitate adjustment of belt tension and replacement of the belt.

7 Claims, 34 Drawing Figures

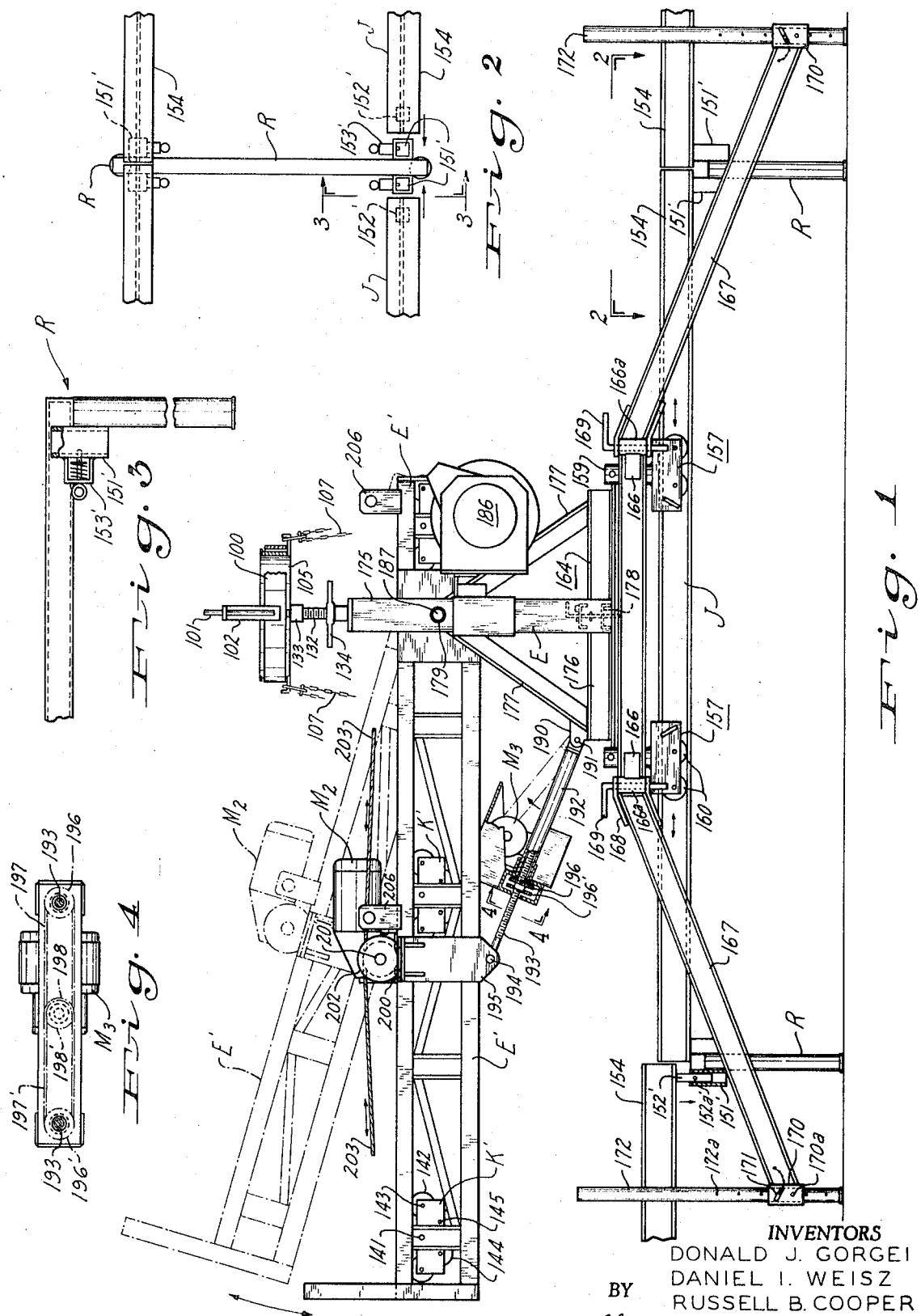

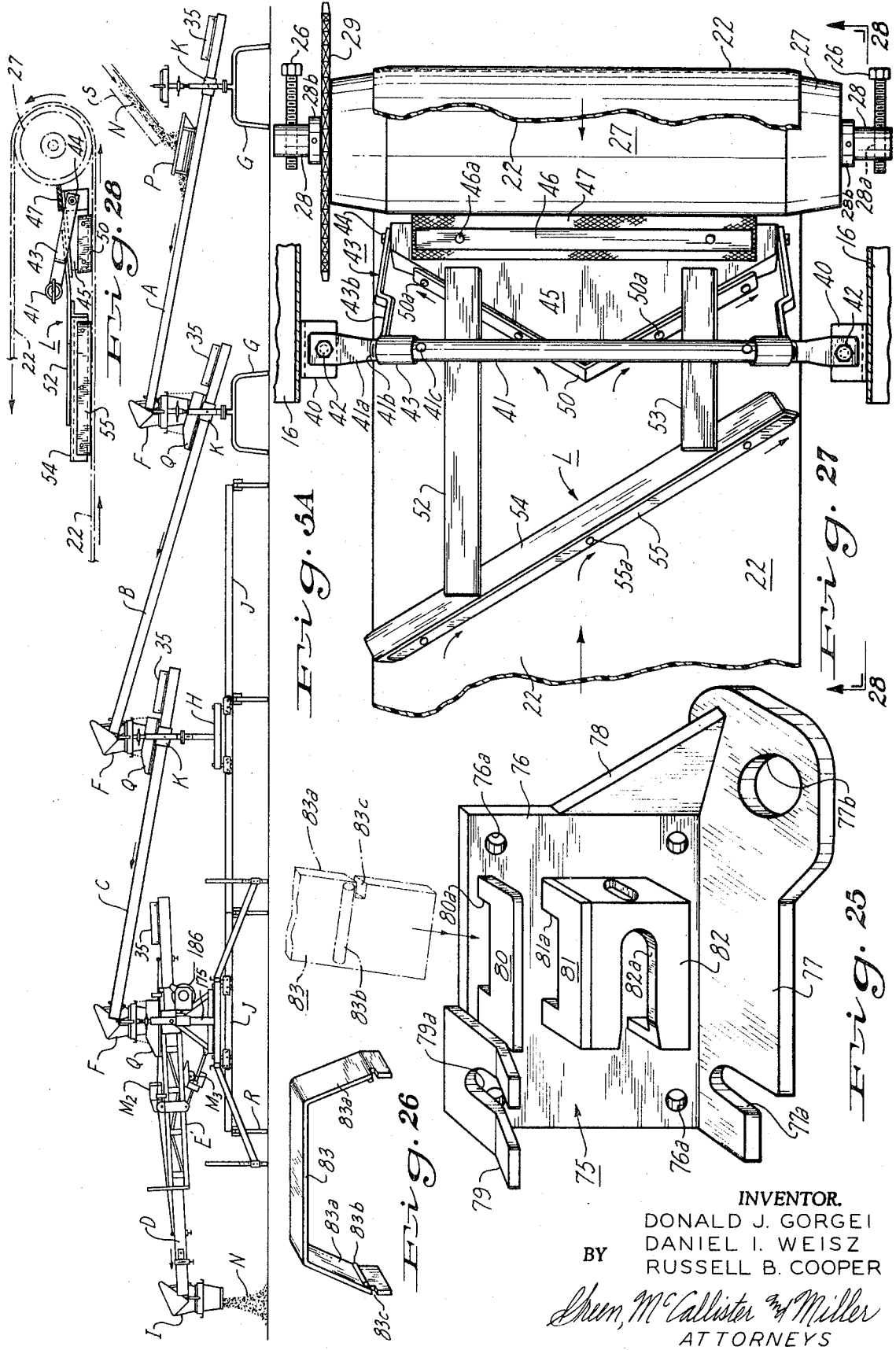

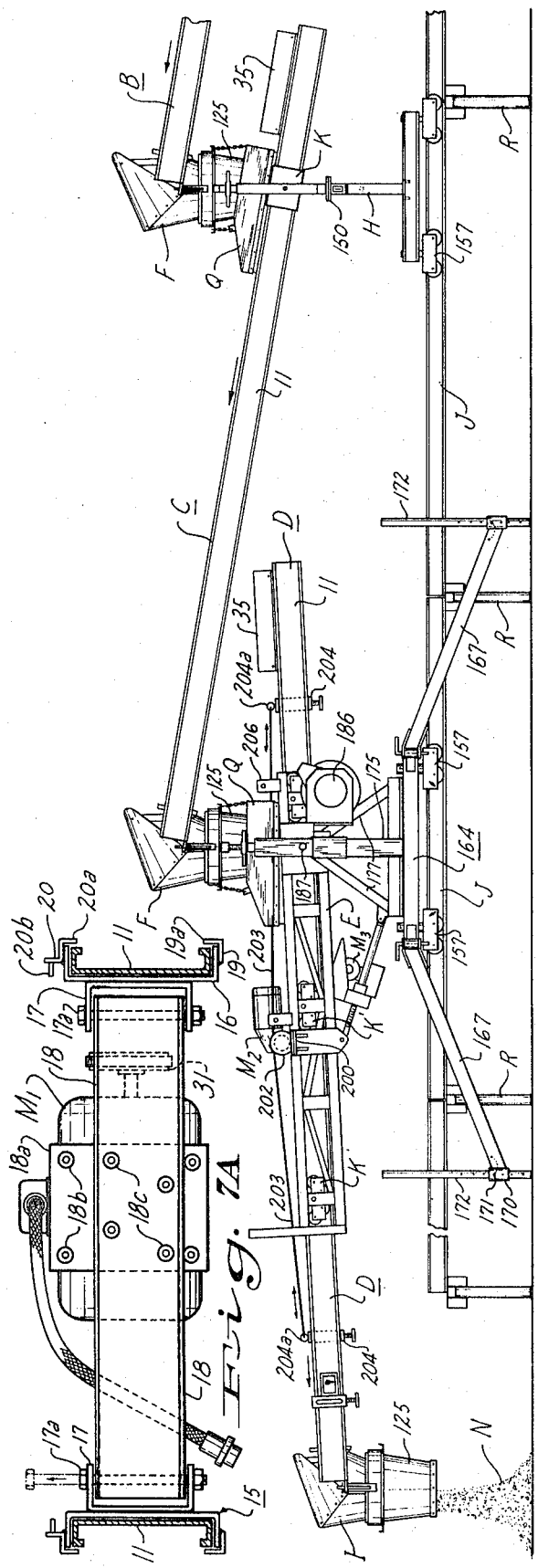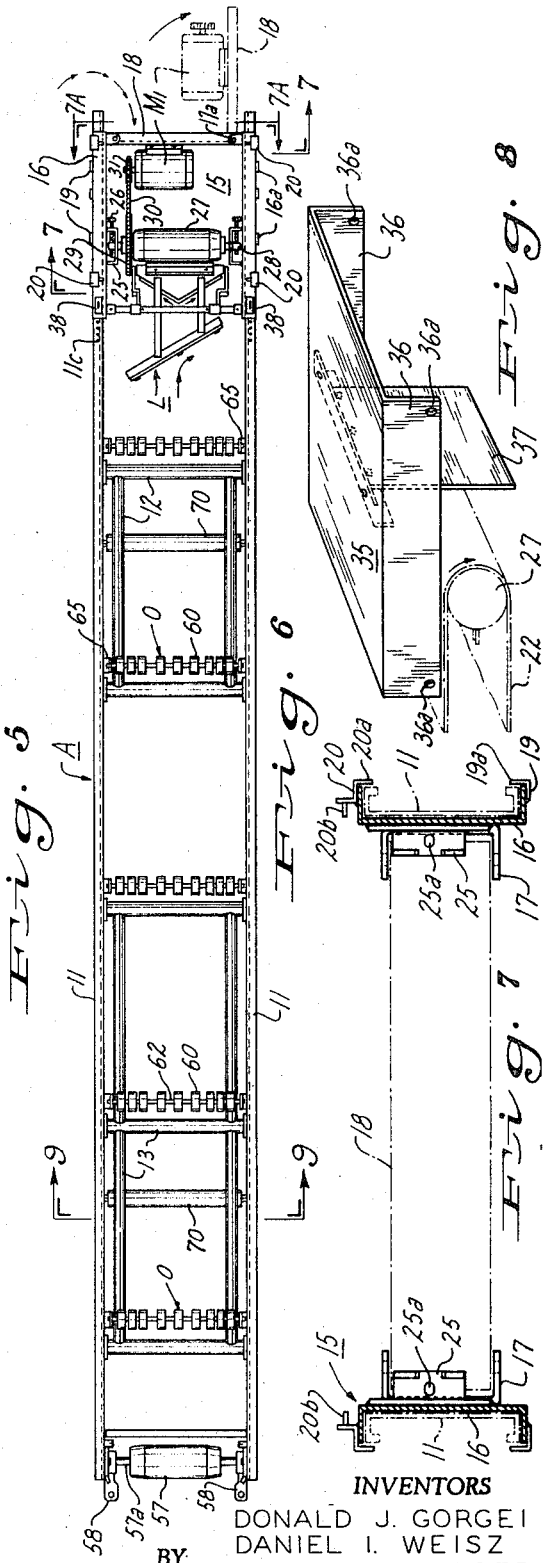

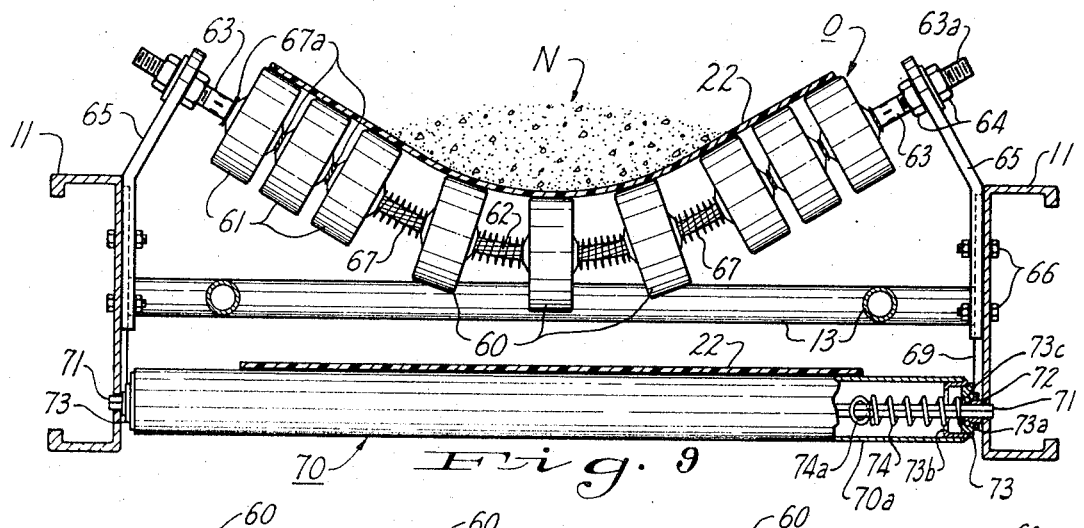

INVENTOR.
DONALD J. GORGEI
DANIEL I. WEISZ
RUSSELL B. COOPER
BY
Green, McCallister and Miller
ATTORNEYS INVENTOR.
DONALD J. GORGEI
DANIEL I. WEISZ
RUSSELL B. COOPER
BY
Green, McCallister and Miller
ATTORNEYS

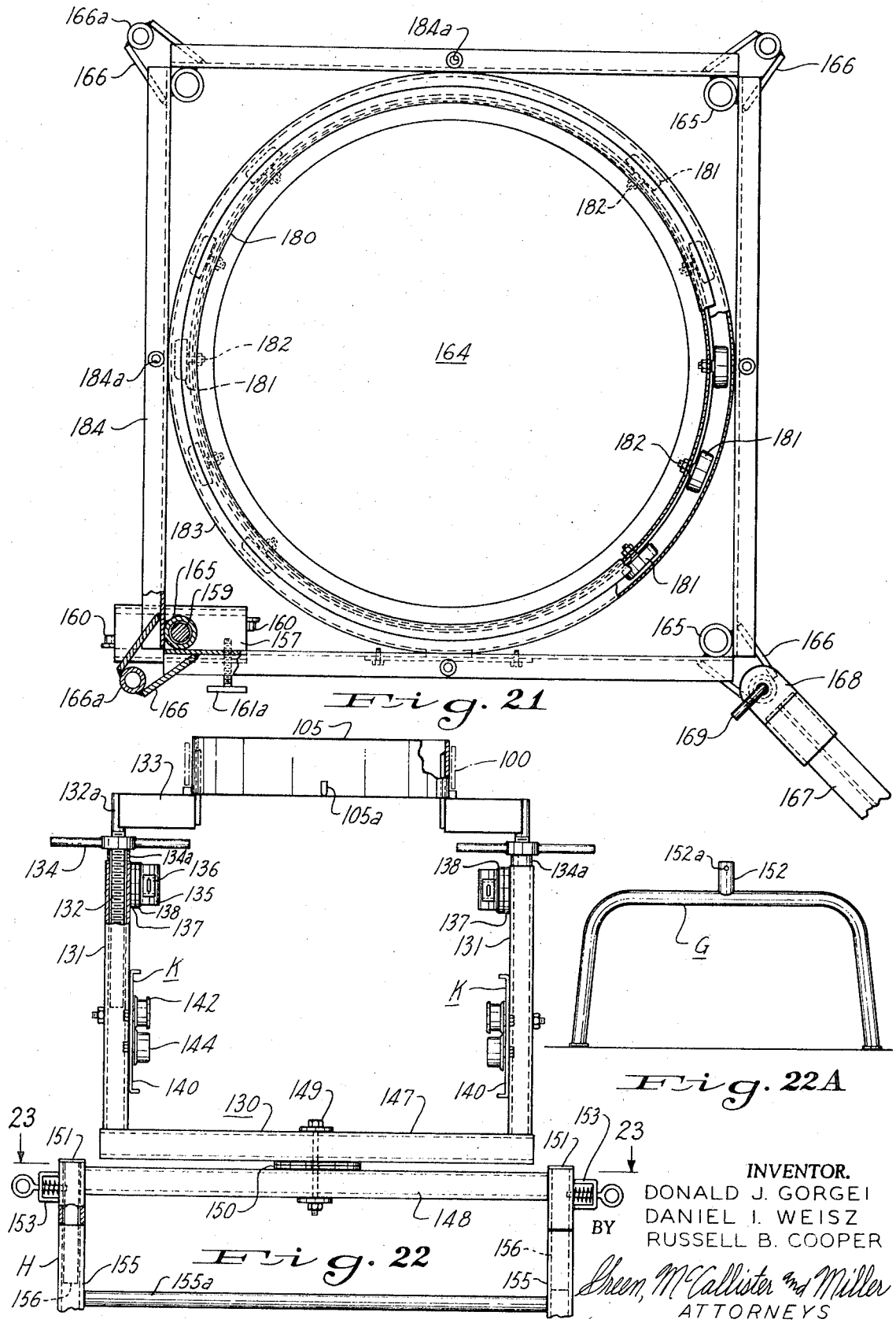

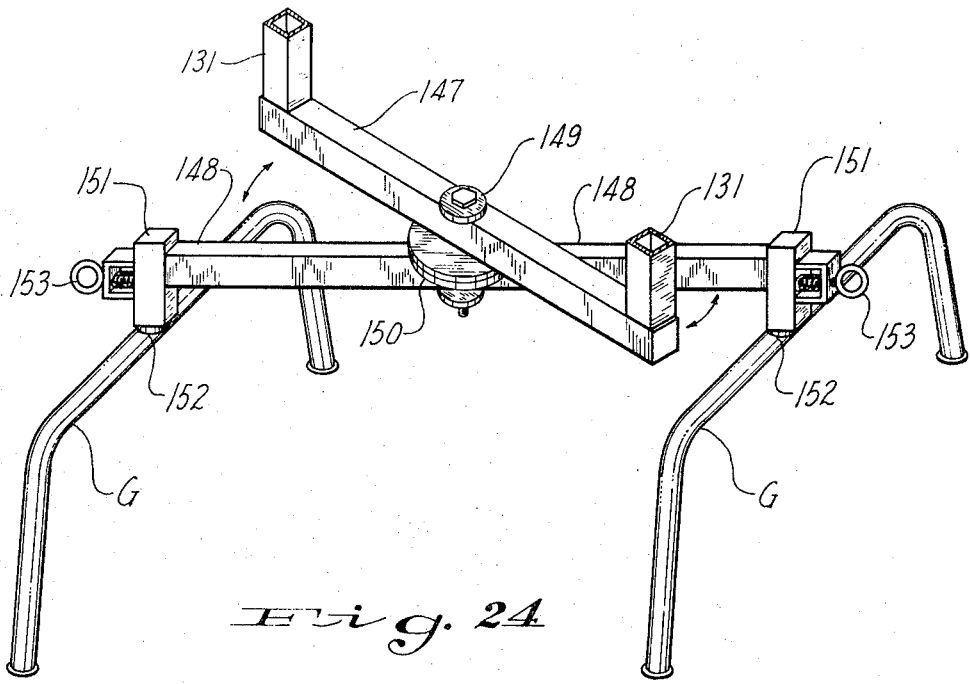
Fig. 24
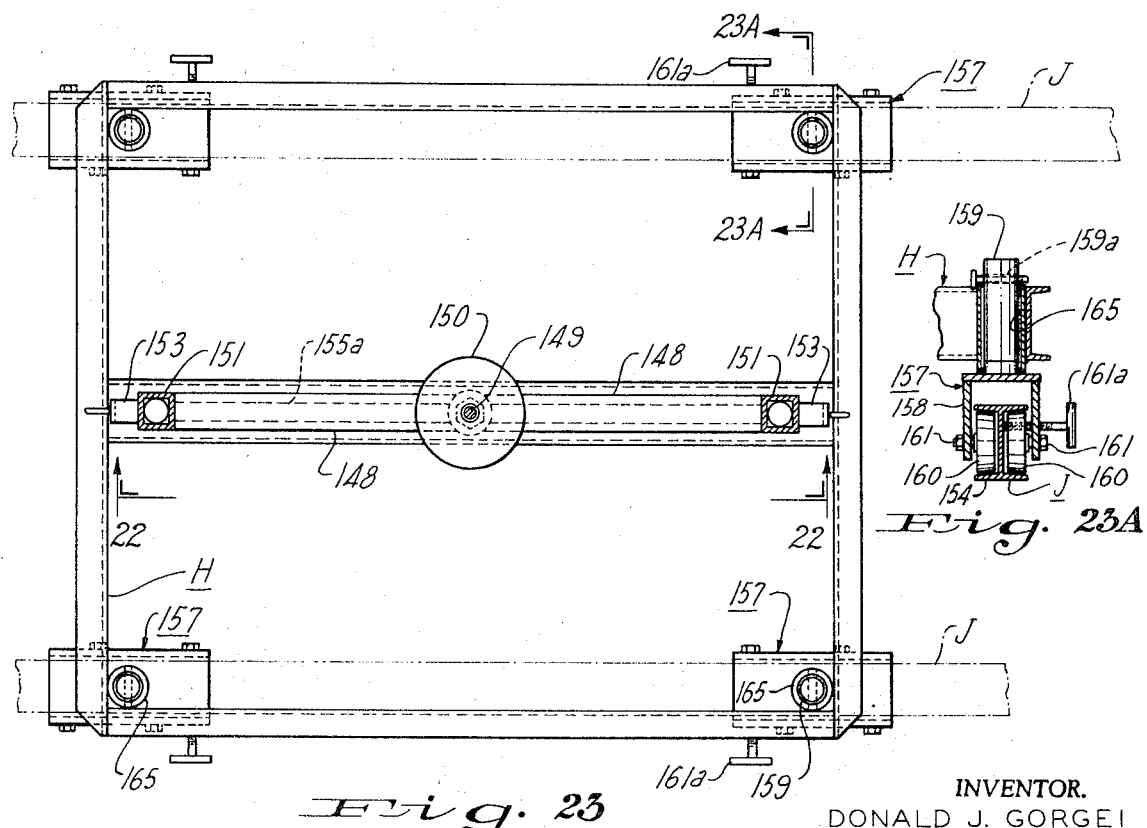
Fig. 23
Fig. 23A
INVENTOR.
DONALD J. GORGEI
DANIEL I. WEISZ
RUSSELL B. COOPER
BY Green, McCallister and Miller
ATTORNEYS

CONVEYOR SYSTEM FOR VISCOUS OR CEMENTITIOUS MATERIAL This invention pertains to a new and improved process, system and apparatus construction for receiving viscous or flowable material such as cementitious material or grout from a suitable supply agency, source or point, for transferring the material from the source to a work area and particularly, for effecting efficient delivery of the material without waste and in a suitable pouring condition at any number of suitable locations to conform with and cover the work area.

There has been a need for an improved system for receiving, transferring and delivering material and particularly cementitious material or grout at work locations, such as a construction location for a commercial building, a manufacturing plant, a bridge, etc. Such a system must handle the materials expeditiously while minimizing loss or waste during handling and without adversely affecting its desired condition for usage at a particular work area and while, at the same time, enabling a highly flexible adaptation of apparatus of the system to meet variously located work areas and facilitate immediate and easy movement of its delivery or turret end by a workman. An important need has been to provide improved means for removing the material at the head end of a transfer or turret conveyor section which will permit continuous operation of the system without stoppage or frequent maintenance, will facilitate the replacement of continuous belts, and will provide apparatus that is not only flexible from the standpoint of its work position adaptation, but from the standpoint of its utilization in the system and of its adaptation to movable as well as stationary mounting or support means.

It has thus been an object of the invention to provide new and improved procedure and apparatus for conveying grout or cementitious-like material;

Another object has been to devise improved means for transferring the material between cooperating ends of a pair of continuous conveyor sections, and for facilitating assembly and disassembly of its parts;

A further object of the invention has been to devise a new and improved form of turret section or construction in a conveyor system;

A still further object has been to provide a new and improved mounting of motor drive means and cooperating driven pulley means for a continuous conveyor belt within a tail end portion of a conveyor section to facilitate replacement of the belt;

These and other objects of the invention will appear to those skilled in the art from the embodiments disclosed and described. In the drawings:

FIG. 1 is a side view in elevation of a main turret section or assembly mounted on rails and stabilized by adjustable outriggers; in this view, a conveyor section stabilized frame of the turret assembly has been omitted;

FIG. 2 is a horizontal fragmental section on the scale of and taken along the line 2—2 of FIG. 1, particularly illustrating details of latching pin and socket means for extending track rails and for mounting a floor supported leg assembly or stand;

FIG. 3 is a slightly enlarged vertical fragmental section taken along the line 3—3 of FIG. 2;

FIG. 4 is a front fragmental section in elevation on the scale of and taken along the line 4—4 of FIG. 1; it particularly illustrates details of a motor-driven sprocket and chain drive for operating a pair of screw jacks to raise and lower the turret apparatus shown in FIG. 1;

FIG. 5 is a reduced side elevation illustrating apparatus constructed and assembled in accordance with the invention for conveying cement in viscous form from a truck or tractor delivery point along a transfer-conveyor section or sections to the turret section or assembly of FIG. 1; this view shows the turret assembly provided with its conveyor-delivery section;

FIG. 5A is a further reduced view in side elevation illustrating a three section transfer conveyor frame construction employed with a pick-up section and the turret and delivery or feed section of FIGS. 1 and 5 to provide a system employing the invention;

FIG. 6 is a top plan view of a typical transfer conveyor frame or section on the scale of FIG. 5 and illustrating a driven belt-actuating pulley, a drive motor and a back end or tail mount wherein the motor may be swung out to facilitate replacement of a continuous conveyor belt that is omitted for the purpose of clarity;

FIG. 7 is an enlarged vertical end section taken along the line 7—7 of FIG. 6, with the drive motor and driven pulley means removed to particularly illustrate the side mount construction for carrying them at the tail end of the conveyor frame;

FIG. 7A is an end section in elevation on the scale of FIG. 7 and taken along the line 7A—7A of FIG. 6;

FIG. 8 is an isometric view in elevation on the scale of FIG. 7, particularly illustrating the drive pulley of FIG. 6, a removable top cover plate for the driven tail end of the conveyor frame or section, and a vertical splash plate interposed between the driven pulley and the drive motor;

Figure 15:
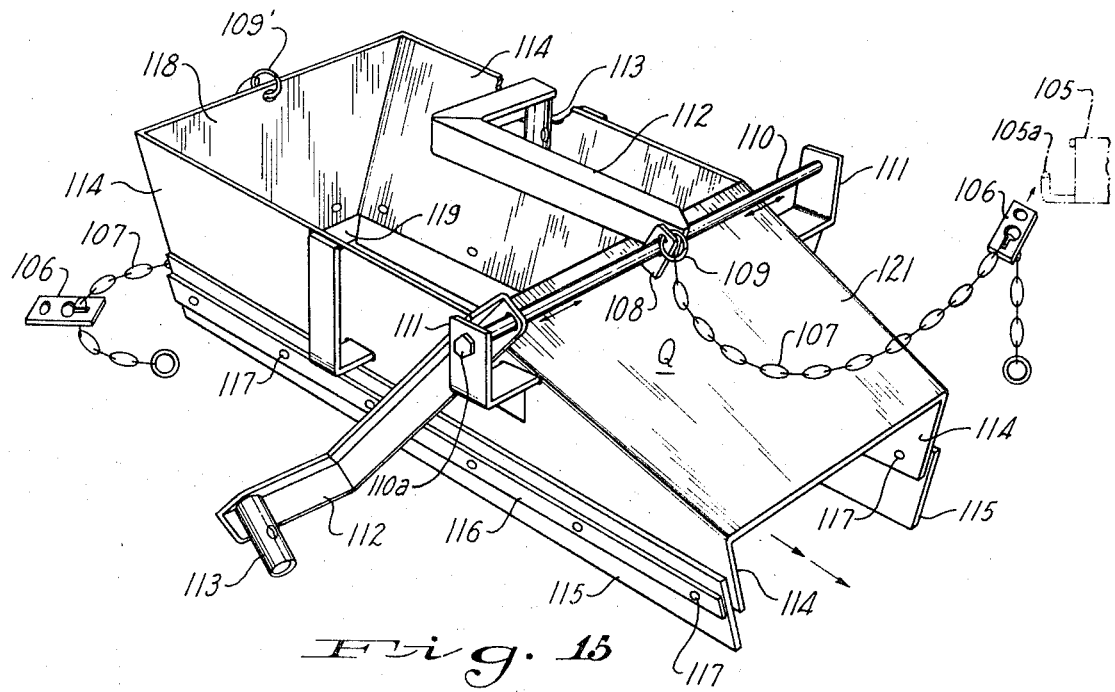
Figure 16:
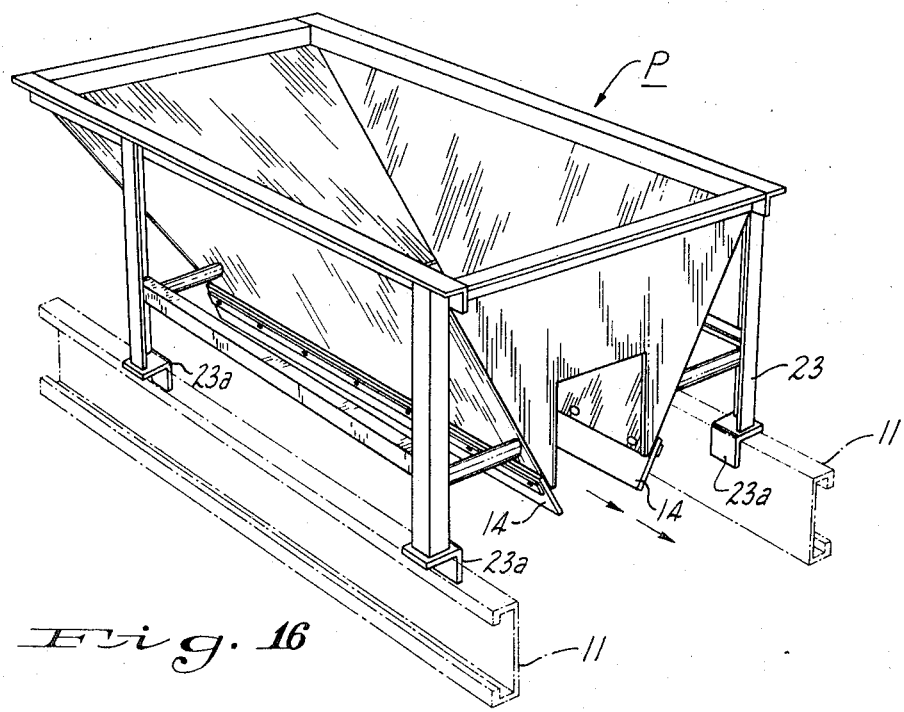
Figures 17, 18, 19:
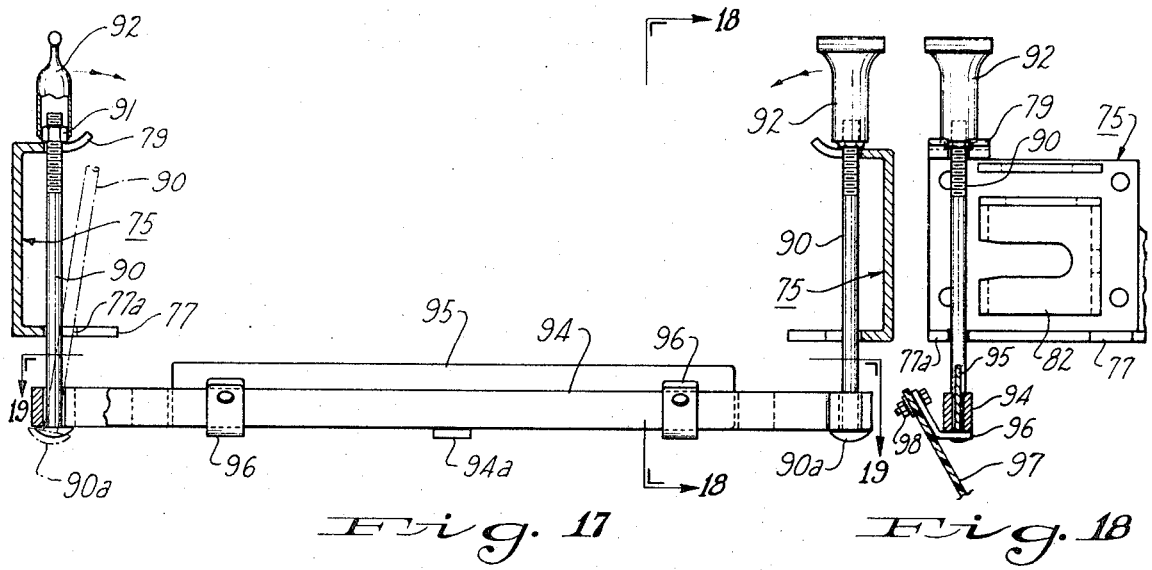

FIG. 9 is an enlarged vertical end section taken in the direction of the line 9—9 of FIG. 6 and particularly illustrating a typical construction of flexible, U-shaped or troughing, belt-supporting pulley or wheel assemblies that are employed in a longitudinally-spaced relation along the conveyor sections or frames of the apparatus; it also shows cross bracing and an under-positioned idler, belt-return pulley;

FIG. 10 is an end fragment in elevation on an enlarged scale with respect to FIG. 9, particularly illustrating the construction and mounting of centrally-disposed belt carrying pulleys; it shows spiral tension spring means for resisting turning movement of the pulley bearing inner races on their flexible cable mounting shaft;

FIG. 11 is a view similar to FIG. 10 illustrating the construction of a modified type of pulley mounting that uses resilient or elastic tubing instead of springs for providing resistance to rotation;

FIG. 11A is a reduced view similar to FIGS. 10 and 11 showing a pulley mounting that uses additional caster pulleys or wheels instead of elastic tubing or springs;

FIG. 12 is a side view in elevation on the scale of FIGS. 9 to 11 particularly illustrating a side rail wheel assembly or unit that is employed for longitudinally-adjustably mounting a side channel member of a conveyor section or frame with respect to a support or a floor stand;

FIG. 13 is an end fragment in elevation and partial section on the scale of FIG. 12 and taken along the line 13—13 of such figure;

FIG. 14 is a side view in elevation and partial section of a funnel that may be used at a forward or delivery end of a conveyor section to deliver material to the tail end of another section and used at the forward or delivery end of a turret section to deliver material to the work area;

FIG. 15 is an isometric view in elevation on the same scale as FIG. 16 illustrating a transfer hopper of an end transfer or delivery assembly between a pair of conveyor sections for cooperating with a transfer funnel of the construction illustrated in FIG. 14 to receive material therefrom and apply or deliver the material to the conveyor belt at the tail end of a forward conveyor section, see FIGS. 5 and 5A;

FIG. 16 is a side isometric view of a receiving hopper which may be utilized as a part of the system for receiving the material from a truck, cement mixer or other suitable source for delivery on the conveyor belt at a tail end of a conveyor section for feed or transfer to a suitable work area, see FIG. 5A;

FIG. 17 is a fragmental detail in elevation on an enlarged scale with reference to FIG. 15, taken crosswise or transversely with respect to a conveyor section to particularly illustrate the construction of an upper scraper assembly that may be mounted adjacent the delivery or forward end of one conveyor section within an upper grout scoop part of a transfer assembly to engage the upper surface of a continuous belt at its delivery end before the belt turns downwardly on its head pulley for return movement along the conveyor section;

3

Figure 20:
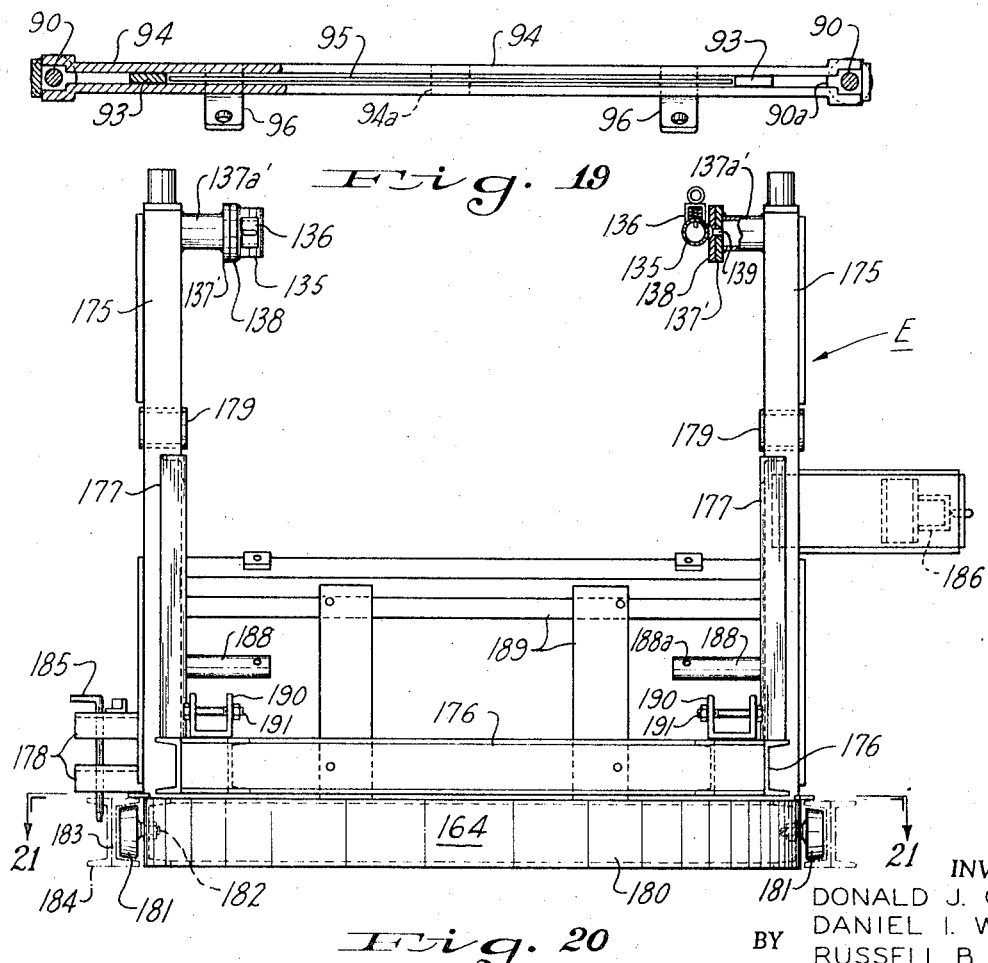
Figure 29:
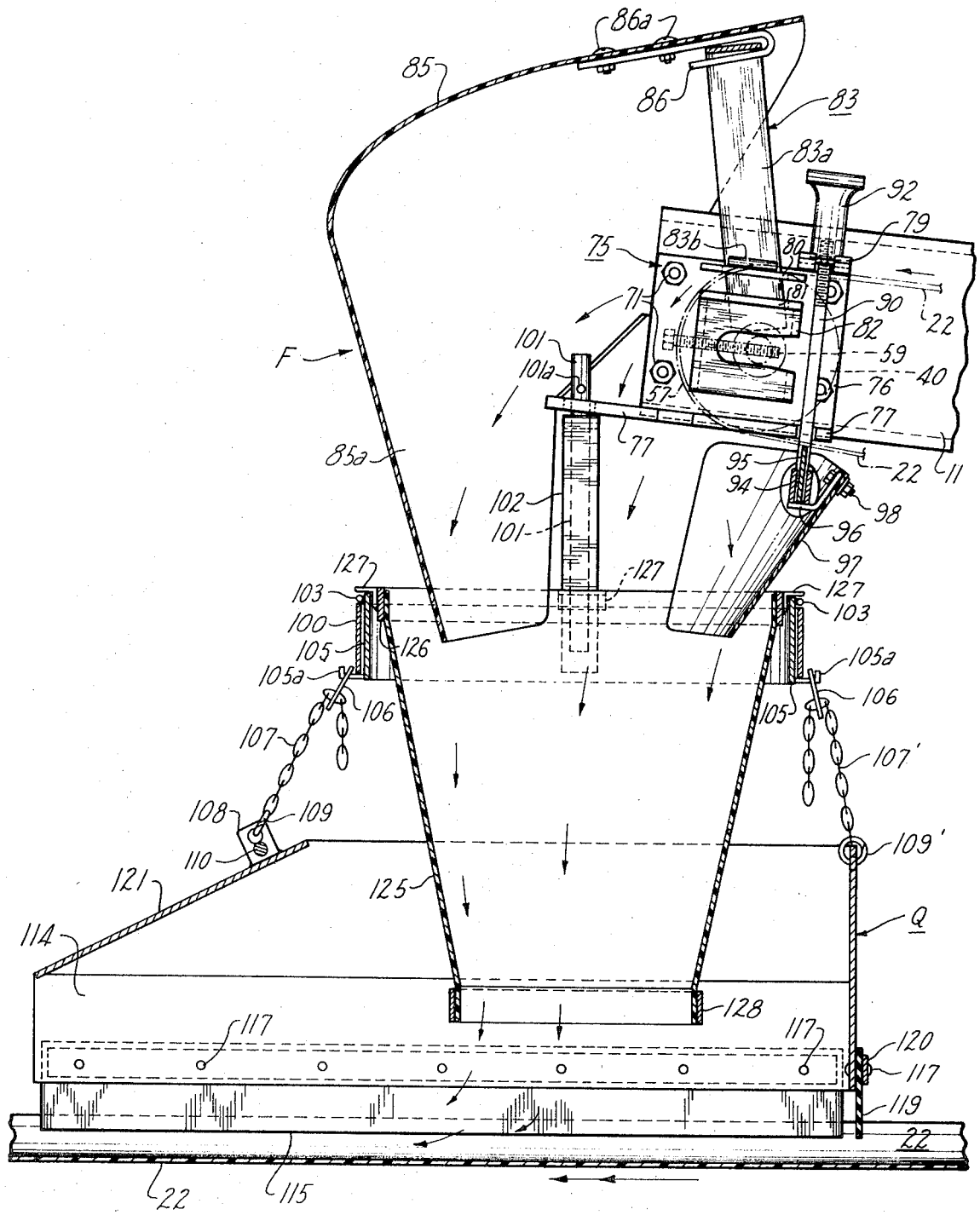

FIG. 18 is a side section in elevation on the scale of and taken along the line 18—18 of FIG. 17; this view shows the mounting of a plastic or resin grout scoop for a transfer assembly;

FIG. 19 is a horizontal section on the scale of and taken along the line 19—19 of FIG. 17 of the scraper assembly of FIGS. 17 and 18;

FIG. 20 is an end view in elevation of a horizontally-rotatable support frame or turret for the apparatus shown particularly in FIG. 1;

FIG. 21 is a horizontal section on the scale of and taken along the line 21—21 of FIG. 20;

FIG. 22 is an elevation in partial section taken along the line 22—22 of FIG. 23 and illustrating an end transfer stand that may be employed with an end transfer assembly; this figure shows cooperating ring members, vertical adjusting screws, a horizontal swing frame, side-positioned wheel or roller sets and a form of bottom support stand;

FIG. 22A is a similar vertical view showing a floor support leg such as employed in the system or assembly of FIG. 5A;

FIG. 23 is a horizontal section on the scale of and taken along the line 23—23 of FIG. 22;

FIG. 23A is a fragmental vertical section on the scale of and taken along the line 23A—23A of FIG. 23;

FIG. 24 is a schematic view in elevation on the scale of FIG. 23 showing a pair of stationary floor legs of the type illustrated in FIG. 22A as employed to carry a turntable frame such as shown in FIG. 23;

FIG. 25 is an enlarged side isometric view of a mounting bracket of a transversely spaced-apart head-mounted primary pair within which a spring clip (see the dot and dash lines) of a hood mount is inserted, which carry a head pulley and which suspend a front end scraper and boot assembly, see the arrow of this FIGURE and the details of FIG. 29;

FIG. 26 is an isometric view of a spring clip type of hood mounting or auxiliary bracket that is adapted to extend across between the pair of primary brackets of FIG. 25 and to be sprung into a latched position therebetween; see also FIG. 29;

FIG. 27 is an enlarged isometric planar underside fragment illustrating a tail scraper assembly in its mounted positioning with respect to the underside of a continuous conveyor belt adjacent to and ahead of a position at which the return flight of the belt engages a drive roller (see also FIG. 6); an inclined forward scraper member and a V-shaped rearwardly-spaced scraper member are shown suspended to engage the inner surface of the conveyor belt before it is advanced into engagement with the driving pulley, and a fabric rubber-like transverse scraper is shown adapted to engage the exposed forward side of the pulley to keep it clean during the operation of conveying cement material;

FIG. 28 is a reduced side view in elevation taken along the line 28—28 of FIG. 27;

And FIG. 29 is an enlarged side section in elevation, particularly illustrating the construction and cooperative positioning of the parts of an end transfer assembly for feeding or delivering cement or grout from the head pulley end of one conveyor section to the tail pulley end of an endwise-adjacent, second or forwardly positioned conveyor section.

In operating a system such as illustrated in FIGS. 1, 5 and 5A, grout material, viscous or somewhat fluid cement mix N to be handled is shown introduced to a first conveyor or transfer section A from a suitable source, such as represented by a chute S of a cement mixing or supply truck. The material N is shown being fed into a so-called truck hopper P that is particularly illustrated in FIG. 16. The hopper P is constructed to longitudinally-centrally concentrate the delivery of the material N to a continuous conveyor belt 22 of the conveyor section A, downstream or near the tail end portion thereof, to flow in or along a concavity, central longitudinal U or valley that is defined by the belt (see FIG. 9). A pair of opposed, side-positioned fabric or reinforced rubber-like guide blades 14 are adapted to be positioned within close adjacency with the upper surface of a continuous conveyor belt 22 on opposite sides of its longitudinal valley (see also FIG. 9). Legs 23 of the frame of the hopper P are slidably-adjustably and removably-positioned on side rails 11 of the conveyor section by angle-shaped feet 23a.

As shown particularly in FIG. 5A, the material received by the conveyor section A is advanced longitudinally-forwardly and upwardly in a somewhat gradually inclined path towards a forward or head end thereof over a head pulley 57, see FIGS. 6 and 29, into a vertically disposed end transfer assembly F. The transfer assembly F delivers the material, both by the advancing force exerted by the conveyor belt 22 over a head pulley 57 and by gravity, vertically-downwardly upon a tail end portion of a second conveyor or transfer section, such as B. Transfer hopper Q of FIGS. 15 and 29 has a similar purpose to the hopper P of delivering the material N along a central longitudinal path into the concavity of a conveyor belt 22.

Although three transfer-conveyor sections A, B, C are shown in FIG. 5A, it will be appreciated by those skilled in the art that any suitable number may be employed, depending on the distance over which the material N is to be transferred, and depending upon the location and extent of the work area to which the material is to be delivered. Stationary supports or directly-mounted, inverted U-shaped, stationary floor legs G are shown in FIGS. 22, 22A, 23 and 24. The legs G may be interchangeable with a track mounting stand H, such as shown for supporting the forward end of section B and the tail end of section C in FIG. 5A. It has been found desirable to provide the leading section, frame or unit of the system which serves as the delivery unit to the work area, in the form of a turret E having a cage or frame that carries a conveyor section D. The turret E is shown as track or rail mounted to facilitate longitudinal or "in" and "out" accommodation that, with rail mounting of the support stand H, gives the system a considerable vertical and transverse width of work area to which the material may be delivered. The delivery may be controlled for example by a workman positioned to hand-move the delivery end of the conveyor section D at its material delivery assembly I (similar to transfer assemblies F) for uniformly, or in any desired manner, progressively covering a considerable work area in any desired pattern. The flexible utilization of the delivery as effected at the assembly I is also facilitated by providing the turret E with a full 360° horizontal swingable or pivotal mounting, and with means for tilting it and the conveyor section D carried thereby in a vertical-angular relationship.

A track construction or section J, see particularly FIGS. 1, 2, 3, 5 and 5A, is shown as having spaced-apart, inverted U-shaped support frames or upright stands R that are made up of a pair of transversely spaced-apart, upright tubular legs and an upper integrally-connected, horizontally cross-extending, tubular, connecting member. FIGS. 2 and 3 particularly illustrate how the support frame R and pairs of I-beam shaped rail members 154 may be removably-locked together by latch pin and socket assemblies that include end-positioned pairs of sockets 151' of rectangular section that are secured to the sides of the frame R, a spring-pressed latch pin assembly 153' carried by each socket 151', and a cooperating vertical latch plug of rectangular section that is secured to project downwardly from the bottom flange of each rail member 154 adjacent an end thereof and adapted to fit downwardly within an associated socket 151'. A latch pin of the assembly 153' extends through a hole in the wall of the socket 151' to engage within an aligned hole in the wall of an associated plug 152' to removably-hold the rails 154 in an assembled relation on the stands R. The latch pin of each assembly 153' may be gripped by its end loop to pull it outwardly against the resiliency of the spring to release the plug 152' when a rail member 154 is to be removed.

FIGS. 6, 7, 7A and 8 illustrate a typical transfer-conveyor frame or section as utilized in the form of such representative units as A, B, C and D of FIG. 5A. As shown in FIG. 6, a pair of transversely spaced-apart longitudinal side rail members 11 of channel construction are provided, whose top and bottom flanges extend outwardly of the frame and guidably-support, side-mounted, wheeled carriages or units K, see FIGS. 12, 13 and 22, that are used for longitudinally-adjustably connecting a forward end of one transfer or conveyor section to the tail end of another section, and also in slightly modified form K', for adjustably-mounting a conveyor section D within a mounting frame or cage of turret E. The side rail members 11 are secured together in an aligned and spaced relation by suitable cross-extending, reinforcing frames 12 and 13 (see FIG. 6) to provide a unitary, relatively narrow, longitudinally-extending support frame. The frames 12 and 13 are shown made up of tubular members secured to the side rails 11 by rivets 13a that extend through web portions of the side rails (see FIGS. 6 and 13).

Each conveyor section A, B, C and D, see FIG. 6, is provided with a belt driving unit or assembly 15 at its tail end portion which includes an electric drive motor $M_1$, a driven main belt driving pulley or roller 27, and a tail scraper assembly L, see FIGS. 27 and 28. As particularly illustrated in FIGS. 6, 7 and 7A, the side rail members 11 carry a slide frame at the tail end of the conveyor section, see representative section A. The slide frame has a pair of channel-shaped side members 16 that fit in a complementary manner along associated side rails 11 and a cross-extending end or tail gate channel member 18 that is removably-mounted at its ends by a pair of channel or U-shaped brackets 17 that are secured to the side members 16. Pivot-like bolt and nut assemblies 17a (see FIG. 7A) enable the gate member to be disconnected at either of its ends by removing one bolt and nut assembly to swing inwardly and outwardly on the other bolt and nut assembly. The side members 16 serve to both mount the motor $M_1$ and the driven pulley 27. The side members 16 of the tail gate or secondary frame mount the pulley 27 through the agency of a pair of mounting brackets 25, and the motor $M_1$ through the agency of the gate member 18. A group of angle pieces 19 are secured in a longitudinally spaced relation on and along the bottom flange of each member 16 to guidably-endwise-slidably position the tail gate frame in cooperation with pairs of upper, angle-shaped, angle brackets 20. It will be noted that the angle pieces 19 have an upturned flange 19a and that the angle brackets 20 have downturned flanges 20a to cooperate with "up" and "down" turned flange end portions of the side rails 11.

The motor $M_1$ (see FIG. 7A) has a base plate 18a secured thereto by bolts 18b, and the base plate 18a is, in turn, removably-secured somewhat centrally on and to extend inwardly from the tail gate member 18 by bolts 18c. The motor $M_1$ has a sprocket 31 (see FIG. 6) which is connected through a drive chain 30 to a drive sprocket 29 that is mounted on one end of the driving pulley 27 for actuating it. Endwise removal of continuous belt 22 from a longitudinally-extending operating position on the frame of the transfer section A shown in FIG. 6 and thus, endwise-off driving pulley 27, as well as off idler head roller or pulley 57 is facilitated. This is easily accomplished by removing one of the nut and bolt assemblies 17a to thus pivot the tail gate member 18 about the end of one of the members 16 and an associated side rail 11 to enable the gate 18, as well as the motor $M_1$ to be slightly swung radially-inwardly to remove the chain 30 from its sprocket, and to thereafter move the motor $M_1$ outwardly, as indicated by the dot and dash lines of FIG. 6, out of the way. At this time, an old belt 22 can be slid endwise off idler head pulley or roller 57, off driven pulley or roller 27, and removed from one side of the conveyor frame, and a new belt inserted endwise thereon.

The side channel members 16 of the tail gate frame are, as shown in FIGS. 6, 7 and 7A, slidably-adjustably carried on the side rails 11 and are secured in an adjusted relation by spring-pressed latch pins of a pair of latch assemblies 38 that correspond in construction to the assemblies 153' of FIG. 3. The pin of each assembly 38 is adapted to extend into one of a series of longitudinally spaced-apart holes 11c in the top flange of an associated side rail 11. As shown in FIGS. 7 and 8, the tail gate frame 15 may be provided with a removable top cover 35 whose side ear portions 36 are adapted to fit between the side pairs of longitudinally spaced-apart angle-shaped mounting brackets 20. Each side ear portion 36 has a pair of slots or holes 36a therethrough to latch-engage with a corresponding inwardly-projecting pin 20b of each bracket 20. A transversely-extending, vertical tab or apron portion 37 is mounted to extend underneath the cover 35 behind the driving pulley 27 and between it and the motor $M_1$ for the purpose of giving additional splash protection to the motor. The cover 35 may be inserted and removed by merely flexing the side ear portions 36 to engage and disengage the pins 20b.

The alignment of the belt 22 on the pulleys 27 and 57 and tension of the drive chain 30 are adjusted by threaded cap screws 26 that have a threaded mounting in an associated end of a fixed shaft 28 on which roller 27 is mounted. In this connection, each screw 26 has an adjustable mounting within a side bore 25a of an associated shaft mounting bracket 25 (see FIGS. 6 and 7), and an adjustable mounting within a threaded bore 28a (see FIG. 27) that extends through an associated end of the fixed shaft 28 on which the roller 27 is journaled. As shown in FIG. 27, a pair of collars 28b retain the roller 27 in a central position on the shaft 28. Belt tension is adjusted by slidably-telescoping members 16 along rails 11 and pinning-in place or latching with latch assemblies 28 into holes or slots 11c.

Scraper assembly L (see FIGS. 6 and 27), like the drive motor $M_1$ and the driven pulley 27, is mounted on and carried by the tail gate or secondary frame structure represented by the side members 16. Thus, by lifting the spring-pressed latch pins of the assemblies 38 out of detent holes 11c, the motor, the driven pulley and the scraper assembly may all be removed as a unit for replacement or repair if desired. Also, the scraper assembly L may be removed as a unit from the secondary or tail gate frame by reason of its mounting on a pair of angle-shaped, side-positioned brackets 40. As shown in FIG. 27, the brackets 40 are secured to project inwardly from the side members 16 to receive tab-like end portions 41a of a rod or shaft-like cross-extending support member 41. Threaded bolts 42 removably-secure the tab portions 41a in place on the brackets 40.

The support rod or member 41 extends across the belt 22 and has a pair of rounded end portions 41b that carry a cooperating pair of mounting collars 43. Cross pins 41c limit maximum inward movement of the collars 43 along the support shaft or rod 41. A downwardly-inclined pair of offset side arms 43b extend integrally-downwardly from the pair of collars 43 and, at their lower ends, are removably-secured by bolts 44 to a triangular-shaped base member 45. The base member 45 in turn carries a somewhat resilient fabric or rubber-like scraper blade 47 through the agency of a metal clamping piece 46 and mounting screws 46a. The scraper member 47 is more of a wiper in that it is adapted to engage the exposed inner side portion of the pulley 27 during its counterclockwise rotation to scrape it clean of any liquid or viscous material that may have been picked up thereby. A pair of longitudinally-extending support pieces 52 and 53 are at their tail ends secured as by welding on the base support member 45 and, at their forward ends, are secured as by welding to an angle-shaped, inclined, cross-extending support piece or rail 54 for a tail scraper blade 55 that is removably-mounted thereon by cap screws 55a. The scraper blade 55 is preferably of steel metal construction and engages the belt 22 on its underside, ahead of but adjacent to the driving pulley 27 to direct heavier accumulations of material towards and off one side of the belt 22.

An intermediate second, somewhat rigid scraper blade 50 of angle shape is carried by the forward end of the support platform member 45 and is removably-secured thereto by threaded screws or bolts 50a. The scraper blade 50 has a triangular shape with its apex located substantially transversely-centrally of the belt 22 to engage its underside after the engagement of the blade 55 therewith. The blade 50 of metal construction thus directs material centrally towards opposite sides of the belt 22, while the blade 55 directs the material along its forward inclination towards one side of the belt (when the belt 22 is moving counterclockwise as indicated by the arrows of FIG. 27). By reason of the fact that its two portions extend in an angular relation toward opposite side edges of the belt 22, the blade 50 tends to feed or deliver any residual material off the belt from both of its sides.

As shown particularly in FIG. 28, the assembly L is suspended in a free-floating relation with respect to the belt 22, since it has a pivot mounting of its collars 43 on the support rod 41. Thus, the balanced weight of the suspended frame L may be used to control the amount of scraping engagement of the blades 55, 50 and 47. If additional force of engagement of these three blade portions is desired, then a suitable weight providing member may be removably secured on either the base member 45 or across the connecting arm members 52 and 53.

Although the pulleys 27 and 40 are shown of substantially cylindrical or uniformly rounded contour at main area peripheral surface portions which are engaged by the continuous belt 22, it will be seen, as particularly illustrated in FIG. 9, that the belt is given a somewhat longitudinally-projected U, valley-like or concave shape, as taken across its section, by the utilization of flexibly-mounted groups or assemblies 0 of troughing or idler support rollers or wheels 60 and 61 of the same construction. A flexible, cable-like or axle or shaft 62 is removably-mounted to extend across between inwardly bent or turned, upwardly-projecting support feet 65 that are removably-secured by bolt and nut assemblies 64 to the side channels 11. It will be noted that the flexible shaft 62 is secured at each of its ends within a crimped sleeve end portion of a stud shaft 63. The hollow outer end portion 63a of each stud shaft 63 is threaded to receive nut and washer assemblies 64 for removably-securing its end to project through an associated support foot 65.

The shaft 62 serves as a flexible mounting axle for individual roller elements or caster wheels 60 and 61. Each element 60 and 61 may be of solid metal rubber or plastic construction with a central mounting hole portion therethrough that carries an inner race 60a and an outer race 60b. Spring washers 67a are positioned between side elements 61 and spiral expansion springs 67 are positioned between central elements 60 to abut the inner races 60a and prevent rotation of the rollers 60 and 61 on the cable 62, rather than between their inner and outer races 60a and 60b. The spring means 67 and 67a exerts an axial tension that functionally resists rotation of the races 60a on the axle 62.

FIG. 11 shows a modified construction in which resilient or elastic tubular material, such as synthetic or rubber sleeves 67' are used for the same purpose as the spring means 67 and 67a. The spring washers 67a and the spiral springs 67 also serve to flexibly maintain the elements 60 and 61 in a desired spaced-apart relation with respect to each other. The weight of the material being carried, the flexible nature of cable shaft 62 and the inward declination of the mounting feet 65, all serve to provide a central, longitudinally-extending area within which material N may be carried with a minimum of side spillage or loss. In the modified construction of FIG. 11A, the springs 67 are shown replaced by additional caster wheels or roller elements 60' that have, in combination with the wheels 60, longer axle bushings to serve as spacers, see 60a.

As shown particularly in FIG. 9, a lower flight or level, belt-return, idler pulley or roller 70 is provided in substantial vertical alignment with each flexible assembly O of the upper belt carrying flight or level. Each pulley or roller 70 has a belt-supporting outer sleeve 70a and a hexagonal axle shaft 71 whose end portions extend into a pair of downwardly-extending leg members 69 that may extend along an inner guide portion of the feet 65 and be secured to the side rail members 11 by the bolt and nut assemblies 66. This facilitates replacement. Each roller 70 has a bearing assembly provided with an inner bearing sleeve or race 72 that has a hexagonal bore to float on the shaft 71. A bearing housing or cage 73 carries rollers 73c that ride on the race 72 and is reinforced by an end portion 73a. A flange-like end portion 73b has a press-fit about the outer periphery of the cage 73 and carries the belt-supporting sleeve 70 thereon. A spiral expansion spring 74 bears against the sleeve race 72 to flexibly urge it outwardly on the shaft 71. A C-shaped cotter pin 74a extends into the shaft 71 to lock the inner end of the spring 74 in place. The pulley 70 can be removed from either end by depressing its axle 70 through one side rail 11 and into the sleeve 70a, while moving the other end of the shaft 71 further into its associated side channel 11.

It will be noted that tension applied to the belt 22 causes it to assume the U-shape of FIG. 9 at the first flexible assembly O and to retain such a shape during its movement along the conveyor section such as A of FIG. 6, and until it engages head or front end pulley 57. It will also be noted, see FIGS. 5A, 15 and 16, that the hoppers P and Q are positioned where the belt 22 has initially attained a V-shape or adjacent the first roller assembly O of the particular conveyor section.

Each conveyor or transfer section, such as A, at one end has a floor stand or support structure, such as K and H, that carries the tail end portion thereof in a longitudinal sliding and a swiveling relation with respect thereto. The front end or head portion of each conveyor section is carried on a similar stand or support structure but in combination with a tail end portion of the next conveyor section (see the connection between A and B). As a result, the conveyor sections are longitudinally extensible and contractible and may be swiveled horizontally with respect to each other. The base support may be of the type of a U-shaped floor leg such as G of FIGS. 22A and 24 or a movable carriage type of support stand, such as H of FIGS. 5 and 22. The connection between adjacent conveyor sections is of an efficient flow type represented by the transfer assembly F.

As shown particularly in FIG. 29, the transfer assembly F includes a pair of especially constructed side-positioned mounting brackets 75 that are removably-secured by bolt and nut assemblies 71 to opposite side channels 11 adjacent the head or forward end portion of the conveyor section or frame. The brackets 75 serve to detachably-suspend the transfer assembly and to facilitate ease of assembly and disassembly of its parts; it particularly provides a quick and efficient means for detachably-adjustably suspending a scraper or wiper blade 95 and its assembly.

As particularly illustrated in FIG. 25, each bracket 75 has a U-shaped, inwardly-projecting, upwardly-mounted, slotted, latch flange mount 80 within whose slotted or window portion 80a is adapted to receive a leg 83a of a spring-like metal clip piece 83 or hood mounting bracket member 83. The opposed side legs 83a of the clip 83 are adapted, as shown by the dot and dash lines and the arrow of FIG. 25, to be sprung inwardly for latch-mounting within the slotted portion 80a of the latch flange 80 of each bracket 75, see the dot and dash lines and the arrow of FIG. 25. In this connection, each leg 83a has a notch or slot 83c in one edge and an above-aligned rib 83b along its outer side to latch-engage an adjacent inner edge of the associated flange 80. It will be noted that the notch 83c has a width that corresponds to the thickness of the flange 80 and, as shown in FIG. 29, the rib 83b limits the maximum entry of each leg 83 within the slotted portion 80a. The spring clip or bracket member 83 extends upwardly and receives a bent-over or hook end portion 86 of a fabric or heavy rubber-like end hood 85 to removably-suspend it therefrom.

It will be noted in FIG. 29 that the hook portion 86 is secured as by bolts or metal screws 86a to inside of the hood 85 adjacent its upper open end or mouth, and that the hood 85 is of substantially right-angular shape, extending from a position at its open upper mouth over and in alignment with ends of the side rails 11 to, as shown by the arrows, direct a continuous movement of the material downwardly from the head pulley 40. To conserve the material and facilitate downward delivery, a scoop or boot member 97, also of somewhat rigid fabric or reinforced rubber material, is provided in an opposed relation with a downwardly-projecting, front apron portion 85a of the hood 85 to provide a back-up for the cementitious material. It will be noted that the fabric-like boot 97 is of curved shape that is concave inwardly to cooperate with and close-off the open front side of the hood 85 below the forward head end portion of the associated conveyor section, and to receive material scraped-off the belt 22 by a scraper blade 95. The boot 97 is suspended from a structure further illustrated in FIGS. 17, 18 and 19 which includes a pair of vertically-adjustable suspension bolts 90. Each bolt 90 has a head 90a that mounts it to extend upwardly through a hole in an end of a cross-extending wiper blade support member 94. The stem of each bolt 90 extends along aligned open-end slots 77a and 79a of a pair of upper and lower, vertically spaced-apart, inwardly-extending mounting flanges 77 and 79 of an associated side bracket 75. The upper threaded end of each bolt 90 is adapted to receive a nut 91 and an enlarged grip head 92 to provide a thumb nut assembly. It will be noted that the upper flange 79 has an upturned end to retain the upper end of nut and bolt assembly 91, 92 on the associated bracket 75.

The support member 94 is bifurcated, since it has a pair of parts that are mounted in an opposed spaced-apart relationship by spacer pieces 93, a central strap member 94a, and a pair of angle-shaped mounting clips 96 that are all welded in position thereto. The construction thus provides an upwardly-open slot within which cross-extending scraper blade 95 is positioned to, as shown in FIG. 29, engage the outer side of the belt 22 immediately adjacent the head pulley 40 and on the lower level or return flight of the belt. The clips 96 not only close-off the lower end of the slot in the member 94 to retain the blade 95, but also are inclined-upwardly to removably-receive the boot 97 that is secured thereto by bolt and nut assemblies 98.

It will be apparent that, as shown in FIG. 29, the outer side of the belt 22 is scraped clean of cementitious material underneath and adjacent the head pulley 40 at a location where the belt has been moved from its upper forward level or flight to its under return level or flight. Residual belt-adhering material is thus scraped into the boot 97 and moves downwardly along the main body of the material that is directed by the hood 85.

Referring to FIGS. 1, 5, 22 and 29, the material delivery or transfer assembly F has a transfer frame that carries a ring assembly comprising rings 100 and 105, and that has upper and lower parts that are rotatably-connected together by the rings. FIG. 29 particularly illustrates the upper part of the transfer frame that carries or suspends outer ring 100 from a forward head end portion of one conveyor section, and FIG. 22 which is taken at right angles to FIG. 29, particularly illustrates the lower part that carries the inner ring 105 and that is carried by side-positioned wheeled units K on the tail end portion of a second conveyor section. The outer ring, band or annulus 100 extends downwardly from the forward head end portion of each conveyor section or frame through the agency of the outwardly-projecting side-mounted brackets 75 which, as previously pointed out, also carry hood 85, scraper blade 95 and boot 97. A pair of vertically-upwardly-extending mounting rods 101 are weld-secured with strap members 102 on opposed sides of the ring 100, and with the rods extending upwardly through a hole portion 77b in the lower flange 77 of each associated mounting bracket 75. The mounting brackets 75 as bolt-secured to side rails 11 of the conveyor section thus provide a pair of transversely spaced-apart overhead mounts for the transfer assembly F. Each rod 101, as shown in FIG. 29, has a cross or through-extending hole 101a adjacent its upper end to receive a cotter pin or the like for securing it in position. Also, it will be noted that a suitable vertically-spaced relation is maintained between the forward end of the rails 11 and the suspended outer ring 100 by the strap members 102.

Inner ring, band or annulus 105 is positioned in a rotatable cooperating relation with the outer ring 100 by a series of outwardly-positioned peripherally spaced-apart short lengths of bars or rods 103 that are secured as by welding to the outer side of the inner ring 105 to rest upon the upper edge of the outer ring 100. A pair of outwardly-projecting hooks 105a are welded to the inner ring 105 adjacent its bottom edge to project outwardly therefrom along the bottom edge of the outer ring 100; they also serve to retain the rings in a cooperating, aligned, operating relation with respect to each other. As shown particularly in FIG. 29, the hooks 105a further serve to suspend transfer hopper Q through the agency of a pair of suspension chains 107 and 107'. A split ring 109 mounts the lower end of one chain 107 within an eye portion of an upwardly-projecting lug 108 that is centrally mounted on and weld-secured, as shown in FIG. 15, to a cross-extending pivot rod 110 and a front end wall 121 of the hopper Q. The upper end of the chain 107 is hooked-over an associated hook 105a by means of an adjustment plate 106. As shown in FIG. 15, the plate 106 has an upper eye portion to fit over the end of the hook 105a and has a lower, key-shaped slot portion through which the chain 107 is adapted to extend and which enables it to be adjusted to a suitable position along its length and locked in position with respect to the plate. The other end portion of the hopper Q is carried by chain 107' through the agency of a split ring 109' that extends through an eye in its back wall 118 and through the agency of an adjustment plate 106 and a cooperating hook 105a.

A downwardly-converging funnel 125 (see FIGS. 14 and 29) of a relatively heavy thickness of suitable metal, plastic, fabric or rubber-like material is adapted to rest upon the inner ring 105 and to project downwardly therefrom within the confines of the transfer hopper Q. A reinforcing metal top band 126 is secured about the upper periphery of the funnel 125 and has a series of outwardly-projecting peripherally spaced-apart angle pieces 127 which rest upon the upper edge of the inner band or ring 105 to serve as a removable means of support. The lower end of the funnel is reinforced by a metal band 128. Rivets are shown in FIG. 14 for securing ends of the material of the funnel 125 together vertically thereof and for securing the material to the bands 126 and 128.

Referring particularly to FIGS. 15 and 29, the transfer hopper Q of metal construction has a pair of downwardly-inwardly sloped side walls 114, a similarly sloped and connecting back wall 118, and a connecting scoop or nose-shaped forwardly-downwardly sloped front end wall 121 that has a small somewhat rectangular front delivery opening or mouth. The cross-extending rod 110 is mounted adjacent the back upper end of the scoop-shaped front wall 121 by means of a pair of side-positioned, angle-shaped mounting brackets 111 and the central lug 108. As shown, the brackets 111 are secured as by welding to the side walls 114 to project upwardly therefrom and receive the rod 110. The rod 110 has a head 110a at one end and may be threaded at its other end to receive a mounting nut (not shown).

A pair of angle-shaped support or suspension arms 112 are, at their inner ends, pivotally and slidably mounted on the rod 110 to extend therefrom adjacent its opposite ends. Each arm 112 has a pin or post part 113 for removably-mounting it in a latching socket, as will be hereinafter described. A pair of longitudinally-extending, side-positioned flaps or wiper blades 115 of a suitable rubber-like or resin material are positioned to extend downwardly in an inwardly-inclined relation from the lower edges of the side walls 114. Metal strap members 116 and screws or rivets 117 may be employed to mount the wiper flaps or blades 115. Lower edges of the blades 115 may have a slight upwardly spaced relation with respect to the upper surface of the conveyor belt 22 or may be in slidable engagement therewith; they serve to retain the cementitious material or grout being delivered within the side confines of the belt 22 until picked-up thereby and moved forwardly along its U-shaped central contour or valley.

Turret structure E at the delivery end of the system is particularly illustrated in FIGS. 1, 5, 20 and 21. As shown, it is mounted on a bottom rotatable table, turret carriage or ring structure 164. The structure 164 has an inner ring or annular, band-shaped roller carrying member 180. A peripherally-spaced series of tapered rollers or wheels 181 are rotatably-mounted on nut and bolt assemblies 182 that extend from the ring 180. As shown particularly in FIGS. 20 and 21, the rollers 181 are adapted to conform in shape to one side of a channel-shaped outer guide member 183 also of ring-like or annular shape for rotative movement in a guided retained relation therealong. The channel-shaped ring guide member 183 is secured within a rectangular frame 184 defined by channel members and secured thereto at quadrant locations, as particularly illustrated in FIG. 21.

In providing the turret E, the inner ring member 180 of the carriage 164 has a surmounting channel-shaped member 176 secured thereto and from which a frame structure extends upwardly, see particularly FIGS. 1 and 20. The frame structure includes a pair of oppositely-positioned upwardly-extending main legs 175, a pair of diagonal reinforcing legs 177 for each main upright leg 175, and a reinforcing structure 189. A pair of rods 188 project inwardly from the diagonal members 177 to provide a support for cover plates (not shown), which may rest in an inclined relation on the reinforcing structure 189 which extends between main legs 175 and the upper frame 176. To lock the turret E in a suitable rotative positioning, particularly one of a series of four quadrant positions, the rectangular-shaped frame 184 (see FIGS. 20 and 21) is provided with latch hole portions 184a extending through a top flange of its members. Also, one leg 175, as shown by the dotted lines of FIG. 1 and the full lines of FIG. 20, has a pair of outwardly-projecting lugs 178 provided with an angle-shaped latch pin 185 that may be lifted upwardly along aligned holes in the lugs and thus, out of an aligned hole 184a in the frame 184 to permit the turret carriage 164 to be rotated to and locked in different positions.

A forwardly-projecting cage-like mounting frame or cradle E' is rotatably mounted on the legs 175 of turret E by means of a pair of horizontal stub shafts or pins 187 and cooperating journaling sleeves 179 that are carried by the legs 175 (see FIGS. 1 and 20). The mounting or cradle frame E' is adjusted, as illustrated in FIG. 1, for "up" and "down" movement by means of a mechanism which includes a reversible electric motor $M_3$. As particularly illustrated in FIGS. 1 and 4, the motor $M_3$ drives a right-angle shaft on which a pair of chain sprockets 198 and 198' are secured. Each of a pair of jack screws 193, at their upper ends, have an eye that is pivotally-secured by a pin 194 to an associated one of a pair of downwardly-extending, transversely spaced-apart side mounts 195 that are secured to opposite side members of the mounting frame. The jack screws 193, at their intermediate portions, carry a chain sprocket 196 or 196' rotatably-threaded thereon. A chain 197 interleaves between motor sprocket 198 and jack sprocket 196 and a similar chain 197' interleaves between motor sprocket 198' and screw jack sprocket 196'.

The lower end of each jack screw 193 is slidably-mounted within a jack sleeve or tubular member 192. Each jack sleeve 192 is open at its upper end and is closed at its lower end to provide a lug that is pivotally-secured by a pin or nut and bolt assembly 191 to a bifurcated mount 190, see also FIG. 20. Each mount 190 projects from a front one of the side-positioned pairs of diagonal members 177. Since each jack sprocket 196 and 196' has a hub provided with a threaded bore that is mounted on a threaded portion of an associated screw jack 193, it will be apparent that rotation of the hubs of the sprocket 196 or 196' against the outer end wall of an associated receiving tubular member 192, will cause the associated jack screw 193 to move inwardly or outwardly with respect to the tubular member and thus, depending upon the direction of rotation of the motor $M_3$, to raise the mounting frame E', as shown by the dot and dash lines in FIG. 1, and in another direction lower it, as shown by the full lines. In this figure, arrows show the type of vertical pivotal swinging movement that may be accomplished.

With reference to FIGS. 1, 21 and 23A, a pair of end-positioned roller carriages or units 157 have been provided for the rotatable carriage assembly 164 and the turret E to enable the turret to be moved longitudinally along a pair of track members 154, such as carried by platform J. Each roller unit 157 has a vertical mounting pin 159 projecting upwardly therefrom and rotatably-carried within a sleeve socket that is secured within an adjacent corner portion of the rectangular frame 184. Each unit 157 has, as shown particularly in FIG. 23A, a U-shaped or bifurcated mounting member or carriage structure 158 whose opposed side walls each carries a pair of track wheels 160 by means of nut and bolt assemblies 161 on which they are rotatably-mounted and by which they are secured to the carriage frame 158. Each side wall of the mounting member or carriage 158 has a pair of the wheels 160 that oppose a pair carried by the other side wall thereof. The wheels 160 fit within opposite sides of an associated I-beam shaped rail member 154 of the structure J. A threaded lock screw 161a is adjustably-carried to extend from an outer side wall 158 of the carriage 157 to engage the web of the rail 154 to lock each wheeled unit 157 in a suitable position therealong.

Also, each corner of the rectangular frame 184 has, as particularly illustrated in FIGS. 1 and 21, a pair of corner extension pieces 166 welded thereto that carry a socket 166a. A stabilizer leg 167 has a bifurcated upper or inner end portion 168 adapted to fit over the socket 166a and has a vertical hole for alignment therewith and through which a latch pin 169 may be detachably-mounted. The pin 169 thus provides a pivotal connection between each leg 167 and the associated connected end of the frame 184. As particularly illustrated in FIG. 1, the outer end of each leg 167 is provided with an integral, open-end sleeve or socket 170 that is adapted to slide up and down on a vertical upright member 172. Each member 172 is adapted to rest on the floor or ground and has suitable vertically spaced-apart cross-extending holes 172a therein to bypass the end of a latch pin 171 therethrough. Also, each collar 170 has a pair of holes 170a therethrough for alternatively receiving the latch pin 171. In this manner, the height of the outer end of each leg 167 may be adjusted as desired.

Although the turret E may be positioned on the rails on a ground level, a better more flexible delivery of the material through the agency of its conveyor frame D is accomplished by mounting it on the rail platform J. This platform, as illustrated particularly in FIGS. 1, 2 and 3, may be made up of a series of end-positioned, transversely spaced-apart pairs of I-beam shaped rail members 154 that, as previously indicated, are removably-mounted at their ends on upright support frames R. A left hand portion of FIG. 1 shows one rail 154 with its pin 152' being moved downwardly, as shown by the arrow, into a mounted relation within the socket 151'. Latch pin receiving hole 152a' is adapted to be aligned (see FIG. 3) with a similar hole through the wall of the socket 151'.

The rail platform J may, as shown in FIG. 5, be employed for supporting a rail cart, truck or carriage type of support stand H of the conveyor section C, whose construction is illustrated in FIGS. 22 and 23, and whose wheeled carriages 157 are the same as those of the turret table 164 of FIG. 21 and are thus also illustrated in FIG. 23A. As illustrated, the front end of the conveyor section B and the tail end of the section C may be supported on track-mounted carriage support H of FIGS. 22 and 23 or on a stationary floor stand structure, such as provided by inverted U-shaped legs or supports G of FIGS. 22A and 24. That is, an upper frame part 130 of the support is constructed so that it may be used with either type of bottom support by the use of latching plug and socket assemblies 151, 152 and 153 which are similar to the previously described assemblies 151', 152' and 153' of FIGS. 2 and 3. FIG. 24 illustrates the use of stationary floor members, such as G, while FIGS. 22 and 23 illustrates the use of carriage structure H for movement along an overhead track platform such as J.

The upper frame 130, whether it is supported on stationary stands G or on truck carriage H is of the same construction. A lower supporting cross member 148 of rectangular section is pivotally-connected by bolt and nut assembly 149 and separating washers 150 to horizontally-swingably carry the upper frame 130 and to latch-engage with either type of bottom support. As shown particularly in FIG. 22, upper rectangular frame 130 is made up of a pair of hollow vertical or upright legs 131, a cross-extending connecting bottom leg 147 and an upper ring or annular band 105. The ring 105 is weld-secured at its ends by a pair of horizontal pieces 133 to upper ends 132a of a pair of threaded jack screws 132. As shown, each jack screw 132 has a hand nut 134 threadably-mounted thereon and adapted to engage the upper end of a leg 131 through the agency of a collar 134a. Thus, rotation of the hand nuts 134 in one direction will provide upward movement of the jack screws 132 within the legs 131 and an opposite rotation will provide lowering movement. It will be noted that the ring 105 is employed to support a funnel such as 125 of FIG. 29 and to cooperate with an outer ring such as 100 and its suspended transfer hopper Q.

Each leg 131 carries a pivot disc and pin assembly 137 that is fixed thereto as by welding. The pin of assembly 137 rotatably-receives a latch socket 135 that has an integral disc or washer 138 that is rotatably-mounted on the end of the pin. Such latch assemblies correspond in construction and operation to the assemblies 151' and 153' described in connection with FIGS. 1, 2 and 3. Each socket 135 is adapted to receive a tubular post or pin 113 of a transfer hopper Q (see FIG. 5) to suspend the hopper between the legs 131. Thus, the pair of arms 112 pivotally-suspend the transfer hopper Q from the legs 131 of the frame shown in FIG. 22. In this manner, a complete transfer delivery assembly may be provided between the cooperating ends of the conveyor sections B and C. The frame 130 also has a side rail engaging pair of carriage or wheeled units K that permit it to be moved longitudinally along the side rails 11 of conveyor section C.

As shown particularly in FIGS. 22 and 23, a socket 151 and a latch pin assembly 153 is carried at each end of the support member 148 to, as previously indicated, either receive a carriage frame, such as H of FIGS. 5 and 22 or direct floor mounting legs, such as G of FIGS. 22A and 24. It will be noted that stand leg G has a central upwardly-extending pin or post 152 that has a cross-extending hole 152a for receiving the pin of latch pin assembly 153. Also, as shown in FIGS. 22 and 23, carriage frame H has a pair of hollow upright legs 155 that have an upwardly-projecting pin or post 156 secured thereto to fit within an associated socket 151. A cross-extending hole is provided in each post 156 for receiving a latch pin of a latch pin assembly 153. The legs 155 are connected by suitable cross-extending rods 155a. The carriage frame H (see FIG. 23) has sockets 165 at its corners that are secured thereto for receiving upright pins 159 of an associated carriage unit 157, as removably-mounted therein by a cross-extending cotter pin 159a.

Referring to FIG. 20, the turret E also has mounts that correspond to those of the frame 130 of FIG. 22 that are used for supporting or pivotally-suspending a transfer hopper Q. The parts which are similar to those previously described in FIG. 22 have been given prime affixes. The only difference is that primary or fixed parts 137' of the structure of FIG. 20 have extension arms 137a' by reason of the wider spacing between the legs 175 as compared to the legs 131.

As shown in FIGS. 1, 5 and 5A, the turret E has a longitudinally forwardly-extending mounting part or frame E' of cage-like construction to slidably-receive a conveyor frame or section D. In this connection, side-positioned carriage or wheeled units K', each of which has a construction corresponding to the unit K illustrated in FIGS. 12 and 13, are provided and carried by the mounting frame E'. A pair of longitudinally-spaced units K' is secured between upper and lower side members or channels of rectangular-shape and extend inwardly therefrom to receive the side rails 11 of the conveyor section or frame D which corresponds in construction to the conveyor frame sections A, B and C which have been previously mentioned.

As shown in FIGS. 1, 5, 5A and particularly in FIGS. 12, 13 and 22, each wheeled unit K and corresponding unit K' has upper and lower pairs of flanged wheels 142 and 144, respectively. Each channel-shaped side rail 11 has its flanges facing sideways of the conveyor frame, and the upper and lower flanges are respectively provided with in-turned edges or rim portions 11a and 11b that are adapted to ride on the flanged wheels 142 and 144, with their outer sides in a cooperative guided relation with the flanges of such wheels, see FIG. 13. As shown, the upper and lower pair of wheels 142 and 144 of each unit K or K' is rotatably mounted by nut and bolt 143 and 145 on a channel-shaped piece or member 140 whose flanges face towards and are spaced above and below the flanges of the associated side channel 11. A bolt and nut assembly 141 is shown mounting the units K or K' on upright or vertical legs 131 of an associated frame 130. As shown particularly in FIG. 12, the upper flanged wheels 142 have a horizontally spaced relation with respect to each other longitudinally of the frame 130 which is greater than the horizontal-longitudinal spacing of the lower pair of rollers 144, such as to provide an offset or staggered relation between the upper and lower pairs.

For moving the conveyor frame D longitudinally-inwardly and outwardly on the side wheeled units K', a pair of spaced-apart adjustable C-clamps 204 (see FIG. 5) are secured over the side rails 11 and have an eyelet 204a projecting upwardly therefrom. A cable 203 is connected at its opposite ends to the eyelets 204a and is looped or interleaved around a reel or sheave 202 that is securely-mounted on a right angle drive shaft 201 of an electric motor $M_2$ (see FIG. 1). The motor $M_2$ is secured by a mounting housing 200 on an upper side of the cage-like frame E'. Thus, rotation of the motor $M_2$ in one direction will cause the cable 203 to pull the conveyor frame D backwardly with respect to the frame E' and rotation in an opposite direction will cause it to pull the conveyor section forwardly with respect to the frame E'.

As shown in FIG. 1, the mounting frame E', itself, is adapted to be swung or pivoted on a horizontal axis represented by cross-extending pivot shaft 187 which is journaled within bearings 179 of the legs 177, see FIGS. 5 and 20. As shown in FIG. 1, the frame E' may have a group of crane-lift attaching posts 206. Remote electrical controls, not shown, may be provided for the motors $M_1$, $M_2$ and $M_3$ which may be energized through a cable carried on a pay-out reel 186 that is carried by the turret E. Employing the transfer assembly illustrated, belt speeds of 700 to 750 r.p.m. and higher are practical, with an optimum of about 752 r.p.m.

With reference to FIGS. 6 and 9, it will be noted that the continuous conveyor belt 22 extends along and between the side rails 11 of the associated conveyor frame and is actuated by motor-driven pulley 27 that is operatively-carried on and adjacent one end of the frame and that carries one or the rear loop end of the belt. Head pulley 57 is operatively-carried adjacent the other end of the frame and receives an opposite or front loop end of the belt. The flexible, upper, cross-extending pulley assemblies O are operatively mounted along an upper reach of the frame in a longitudinally-spaced relation with respect to each other and between the driven and head pulleys for engaging an inner side of the belt 22 in its forward movement along the frame. Lower, cross-extending, relatively rigid tubular pulleys 70 are mounted along the lower reach of the frame, also in a longitudinally spaced relation, to engage an inner side of the belt during its return movement. With particular reference to FIG. 9, it will be seen that the tubular pulleys 70 may be easily inserted and removed by compressing the spring 74 at one end thereof to move the adjacent end of the shaft 71 further into its mounting in the associated leg member 69 so as to clear the other shaft from its associated mounting leg member 69. The use of anti-friction bearings 73c minimizes the power required for moving the belt 22 along the conveyor frame. When one of the springs 74 is compressed, this permits its associated bearing 72 to be moved inwardly out of engagement with a corresponding leg member 69 to thus permit a greater insertion of the corresponding end of the shaft 71 within such leg member 69 and permit removal of the other end of the shaft 71 out of its associated leg member 69.

We claim:

1. In an apparatus for conveying cementitious-like material from a receiving point to a work area, a floor mount, a turret on said floor mount for horizontal rotative movement with respect thereto, a forwardly extending mounting frame pivotally mounted adjacent one end thereof for vertical swinging movement on said turret, a conveyor frame carried by said mounting frame for longitudinal back and forth movement therealong, a winding drum operatively mounted on said mounting frame intermediate opposite longitudinal ends thereof, motor means carried by said mounting frame adjacent said winding drum for rotating said winding drum in reverse directions; cable means operatively wound on said drum and having one end extending longitudinally forwardly along said conveyor frame and connected to a forward end portion thereof, and having an opposite end extending longitudinally backwardly along said conveyor frame and connected to a back end portion thereof; said winding drum being adapted upon actuation by said motor means in one direction to move said conveyor frame forwardly outwardly along said mounting frame and upon actuation by said motor means in an opposite direction to move said conveyor frame backwardly outwardly along said mounting frame, wheeled carriage means mounted at longitudinally spaced-apart locations on said mounting frame and adapted to guidably position said conveyor frame for forward and backward movement along said mounting frame, each said wheeled carriage means having an upper pair of longitudinally spaced-apart flanged wheels rotatably carried thereon and a lower pair of longitudinally spaced-apart flanged wheels rotatably carried thereon in a cooperating staggered relation with respect to said upper pair of wheels; said conveyor frame having a pair of transversely spaced-apart longitudinally extending side-positioned channel-shaped support members positioned with their open sides facing transversely inwardly thereof, and each said support member having its upper flange cooperatively engaging said upper pair of flanged wheels and having its lower flange cooperatively engaging said lower staggered pair of flanged wheels of said carriage means to guidably position said conveyor frame for longitudinal forward and backward movement with respect to and along said mounting frame.

2. In an apparatus for conveying cementitious-like material from a receiving point to a work area, a floor mount, a turret on said floor mount for horizontal rotative movement with respect thereto, a forwardly extending mounting frame pivotally mounted adjacent one end thereof for vertical swinging movement on said turret, a conveyor frame carried by said mounting frame for longitudinal back and forth movement therealong, a winding drum operatively mounted on said mounting frame intermediate opposite longitudinal ends thereof, motor means carried by said mounting frame adjacent said winding drum for rotating said winding drum in reverse directions; cable means operatively wound on said drum and having one end extending longitudinally forwardly along said conveyor frame and connected to a forward end portion thereof, and having an opposite end extending longitudinally backwardly along said conveyor frame and connected to a back end portion thereof; said winding drum being adapted upon actuation by said motor means in one direction to move said conveyor frame forwardly outwardly along said mounting frame and upon actuation by said motor means in an opposite direction to move said conveyor frame backwardly outwardly along said mounting frame, wheeled carriage means mounted at longitudinally spaced-apart locations on said mounting frame and adapted to guidably position said conveyor frame for forward and backward movement along said mounting frame, said mounting frame having a pair of longitudinally extending transversely spaced-apart side frame members, said conveyor frame having a pair of longitudinally extending and transversely spaced-apart side channel members and cross-connecting tubular members; each said wheeled carriage means comprising, a pair of longitudinally spaced-apart wheeled carriages secured to each side frame member of said mounting frame and cooperating with and receiving an associated side channel member of said conveyor frame, said wheels of each of said wheeled carriages being flanged, and each of said side channels being provided with a pair of opposed-inwardly projecting rim portions along inner edges of its upper and lower flanges to provide a cooperating engagement with the flanges of said wheels to retain said wheels in a guided cooperating relation with respect to said side channel members.

3. In an apparatus for conveying cementitious-like material from a receiving point to a work area, an upright floor mount, a rail platform on said floor mount, said rail platform being defined by a pair of transversely spaced-apart longitudinally extending side rail members of I-beam construction and cross-extending connecting members, a wheeled carriage operatively mounted for movement along said rail members, said wheeled carriage having a substantially rectangular frame, a wheel unit at each of the four corners of said rectangular frame, a longitudinally spaced-apart pair of said wheel units being positioned along opposite sides of said rectangular frame for riding engagement with an associated one of said rail members, each of said wheel units having opposed inner and outer wheels positioned along opposite sides of the web of and in riding engagement with an associated one of said rail members, said wheels cooperating with the web and engaging both the upper and lower flanges of the associated rail member for retaining each of said wheel units in a secure non-tilting operating relation for movement along said pair of rail members, a turret operatively mounted on said wheeled carriage and extending upwardly therefrom, a forwardly extending mounting frame pivotally mounted on said turret frame for vertical swinging movement with respect thereto, a conveyor frame carried by said mounting frame for longitudinal and back and forth movement therealong, a winding drum operatively mounted on said mounting frame intermediate opposite ends thereof, motor means for rotating said winding drum in reverse directions, cable means wound on said drum and having its ends extending longitudinally forwardly and longitudinally backwardly along said conveyor frame and secured to forward and back ends thereof, said winding drum being adapted upon actuation by said motor means in opposite directions to move said conveyor frame forwardly outwardly and backwardly outwardly along said mounting frame, and motor driven tilting means operatively extending from said turret frame and connected to said mounting frame in substantial vertical alignment with said winding drum.

4. In an apparatus as defined in claim 3, said turret having a series of wheels operatively mounted thereon in a spaced-apart circular relation with respect to each other, and a wheel-receiving circular flange structure carried by said rectangular frame to receive the wheels of said turret frame for guided movement therealong to rotate the turret.

5. In an apparatus for conveying cementitious-like material from a receiving point to a work area, a floor mount, a turret on said floor mount for horizontal rotative movement with respect thereto, a forwardly extending mounting frame pivotally mounted adjacent one end thereof for vertical swinging movement on said turret, a conveyor frame carried by said mounting frame for longitudinal back and forth movement therealong, a winding drum operatively mounted on said mounting frame intermediate opposite longitudinal ends thereof, motor means carried by said mounting frame adjacent said winding drum for rotating said winding drum in reverse directions; cable means operatively wound on said drum and having one end extending longitudinally forwardly along said conveyor frame and connected to a forward end portion thereof, and having an opposite end extending longitudinally backwardly along said conveyor frame and connected to a back end portion thereof; said winding drum being adapted upon actuation by said motor means in one direction to move said conveyor frame forwardly outwardly along said mounting frame and upon actuation by said motor means in an opposite direction to move said conveyor frame backwardly outwardly along said mounting frame, wheeled carriage means mounted at longitudinally spaced-apart locations on said mounting frame and adapted to guidably position said conveyor frame for forward and backward movement along said mounting frame, a guide ring on said floor mount, roller means, a turret ring operatively carrying said roller means in cooperative engagement with said guide ring, said turret ring and said roller means being carried by said turret, said guide ring being a circular member of channel shape facing inwardly thereof, and said roller means being shaped to complementally fit in running engagement between upper and lower flanges of the inner side of said circular member and along the web thereof for guided movement therealong.

6. In an apparatus as defined in claim 5, said turret ring having a horizontally outwardly projecting upper flange overlapping an upper flange of said circular member for protecting said rollers from fall of sediment.

7. In an apparatus as defined in claim 5, a bottom frame secured to and carrying said circular member, said frame having a spaced group of latch pin receiving open portions therein, and latch pin means carried by said turret and adapted to engage within a selected one of said open portions to secure said turret in a selected non-rotative position with respect to said frame.

* * * * *